(12) United States Patent
Suzuki et al.

(10) Patent No.: US 7,607,672 B2
(45) Date of Patent: Oct. 27, 2009

(54) VEHICLE HEIGHT ADJUSTING APPARATUS

(75) Inventors: Shigeki Suzuki, Toyoake (JP); Akira Kato, Anjo (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 218 days.

(21) Appl. No.: 11/979,806

(22) Filed: Nov. 8, 2007

(65) Prior Publication Data
US 2008/0111337 A1 May 15, 2008

(30) Foreign Application Priority Data
Nov. 10, 2006 (JP) ............................. 2006-305103

(51) Int. Cl.
*B60G 17/052* (2006.01)
*B60G 17/056* (2006.01)
*B60G 17/04* (2006.01)

(52) U.S. Cl. .................... 280/124.16; 280/124.157; 280/5.514; 280/6.157

(58) Field of Classification Search .......... 280/124.161, 280/124.16, 124.157, 5.514, 6.157, 6.158, 280/6.159, 6.16; *B60G 017/052, 017/056, B60G 017/04*
See application file for complete search history.

(56) References Cited

U.S. PATENT DOCUMENTS

| 4,591,185 A | * | 5/1986 | Natsume et al. | .......... 280/6.157 |
|---|---|---|---|---|
| 4,593,920 A | * | 6/1986 | Natsume et al. | .......... 280/6.157 |
| 4,593,931 A | * | 6/1986 | Shiratori et al. | .......... 280/6.157 |
| 4,625,994 A | * | 12/1986 | Tanaka et al. | ............ 280/6.157 |
| 4,709,934 A | * | 12/1987 | Suzuki et al. | ............ 280/6.157 |
| 4,718,695 A | * | 1/1988 | Kawagoe | .................. 280/6.157 |
| 4,787,644 A | * | 11/1988 | Yokote et al. | ............ 280/6.157 |
| 4,858,895 A | * | 8/1989 | Buma et al. | ............... 267/64.16 |
| 4,911,617 A | * | 3/1990 | Buma et al. | .................. 417/439 |
| 4,965,878 A | * | 10/1990 | Yamagiwa et al. | ............ 701/37 |
| 5,180,024 A | * | 1/1993 | Eto | .............................. 180/41 |
| 6,726,189 B2 | * | 4/2004 | Folchert et al. | ........... 267/64.16 |

(Continued)

FOREIGN PATENT DOCUMENTS

JP 50-28589 9/1975

(Continued)

*Primary Examiner*—Ruth Ilan
*Assistant Examiner*—Jordan Golomb
(74) *Attorney, Agent, or Firm*—Buchanan Ingersoll & Rooney PC

(57) ABSTRACT

A vehicle height adjusting apparatus includes air spring portion, an air supply source, a switching valve causing a total air volume of the air spring portion to be constituted by only a main air chamber and by a sum of the main air chamber and a sub air chamber, an auxiliary valve, operating state determining portion for determining an operating state of the vehicle, and controlling portion for controlling the adjusting valve, the switching valve and the auxiliary valve. The controlling portion controls the adjusting valve and the switching valve to shift to closed positions so as to close the first and second passages, respectively, and controls the auxiliary valve to shift to an open position so as to open the third passage and to discharge air in the sub air chamber by a predetermined amount through the air supply source and then controlling the auxiliary valve to shift to a closed position so as to close the third passage in a case that the operating state determining means determines that the vehicle is in one of the transition state and the stopped state.

7 Claims, 5 Drawing Sheets

U.S. PATENT DOCUMENTS

| | | | |
|---|---|---|---|
| 6,845,988 B2 * | 1/2005 | Romer et al. | 280/5.514 |
| 6,874,772 B2 * | 4/2005 | Oldenettel | 267/64.28 |
| 6,983,201 B2 * | 1/2006 | Misawa | 701/37 |
| 7,032,895 B2 * | 4/2006 | Folchert | 267/64.28 |
| 7,066,474 B2 * | 6/2006 | Hiebert et al. | 280/6.153 |
| 7,484,747 B2 * | 2/2009 | Geiger | 280/124.157 |
| 2005/0212225 A1 * | 9/2005 | Suzuki et al. | 280/5.514 |
| 2007/0040344 A1 * | 2/2007 | Stiller | 280/124.157 |
| 2008/0054576 A1 * | 3/2008 | Ilias et al. | 280/5.514 |
| 2008/0195277 A1 * | 8/2008 | Stiller | 701/37 |

FOREIGN PATENT DOCUMENTS

| | | | |
|---|---|---|---|
| JP | 03032914 A | * | 2/1991 |
| JP | 03167019 A | * | 7/1991 |
| JP | 2005-67549 A | | 3/2005 |

* cited by examiner

VEHICLE HEIGHT ADJUSTING APPARATUS

CROSS REFERENCE TO RELATED APPLICATIONS

This application is based on and claims priority under 35 U.S.C. § 119 to Japanese Patent Application No. 2006-305103, filed on Nov. 10, 2006, the entire content of which is incorporated herein by reference.

FIELD OF THE INVENTION

This invention generally relates to a vehicle height adjusting apparatus.

BACKGROUND

A known suspension control apparatus is disclosed in JP2005-67549A. The suspension control apparatus disclosed includes air spring means provided at each of wheels on right and left sides and including a first air chamber and a second air chamber. The suspension control apparatus causes a total air volume of the air spring means to be constituted by only the first air chambers and by a sum of the first air chambers and the second air chambers. As a result, the suspension control apparatus disclosed achieves both the improvement of ride quality and ability to drive on a rough road, and securing of roll stiffness. According to the disclosed apparatus, even when one of the air spring means fails, the roll stiffness is still ensured since the total air volume can be constituted by only the first air chambers by means of the normal air spring means. That is, a communication passage is further provided for connecting the second air chambers to each other that are provided at the wheels on right and left sides, respectively.

A vehicle height adjusting apparatus of present days includes, as illustrated in FIG. 5, an air spring constituted by a main chamber (i.e., main air chamber) MC and a sub chamber (i.e., sub air chamber) SC, an adjusting valve MV allowing and prohibiting a communication of air between an air supply source PS and the main chamber MC, a switching valve CV allowing and prohibiting a communication of air between the main chamber MC and the sub chamber SC, and a height sensor HS all provided at each of the four wheels. The air supply source PS includes a drier to which dry air (air discharged from the air spring) is supplied or through which dry air passes at a predetermined flow speed or less as a condition required for the drier to recover, i.e., to be dried. Thus, a low-pressure tank LP and, when applicable, a high-pressure tank HP are applied for aiming to reduce a vehicle height adjustment time. Such tanks are disclosed in JP50-28589.

As illustrated in FIG. 5 and disclosed in JP50-28589, a conventional vehicle height adjusting apparatus includes a low-pressure tank and a high-pressure tank. In this case, however, a flow resistance of a piping connecting these tanks and the air spring is large and thus sufficient flow speed cannot be assured. Even if a sufficient tank volume is ensured, reduction of a vehicle height adjustment time is limited. For example, according to the vehicle height adjusting apparatus illustrated in FIG. 5, air discharged from the air spring is stored in the low-pressure tank LP for the purposes of reducing the vehicle height adjustment time. Then, while a condition required for recovery of the drier is being satisfied, the air stored in the low-pressure tank LP is continuously discharged to the atmosphere even after the completion of the vehicle height adjustment. However, a flow resistance of a piping connecting the low-pressure tank LP, and both the main chamber MC and the air supply source PS is large and thus a sufficient discharge amount per time unit cannot be ensured.

Thus, a need exists for a vehicle height adjusting apparatus which is not susceptible to the drawback mentioned above.

SUMMARY OF THE INVENTION

According to an aspect of the present invention, a vehicle height adjusting apparatus for adjusting a height of a vehicle, comprising: air spring means provided at each of wheels of a vehicle and including a main air chamber and a sub air chamber; an air supply source including a compressor, the air supply source pressurizing and outputting air at a time the compressor is driven and discharging air at a time the compressor is non-driven; an adjusting valve selectively opening and closing a first passage connecting between the air supply source and the main air chamber; a switching valve selectively opening and closing a second passage connecting between the main air chamber and the sub air chamber, the switching valve causing a total air volume of the air spring means to be constituted either by only the main air chamber or by a sum of the main air chamber and the sub air chamber; the switching valve and the adjusting valve being controlled in response to a height lowering command and a height rising command; an auxiliary valve selectively opening and closing a third passage connecting between the sub air chamber and the air supply source; operating state determining means for determining an operating state of the vehicle including a driving state, a stopped state and a transition state from the driving state to the stopped state; and controlling means for controlling the adjusting valve and the switching valve to shift to closed positions so as to close the first and second passages, respectively, and controlling the auxiliary valve to shift to an open position so as to open the third passage and to discharge air in the sub air chamber by a predetermined amount through the air supply source and then controlling the auxiliary valve to shift to a closed position so as to close the third passage in a case that the operating state determining means determines that the vehicle is in one of the transition state and the stopped state.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
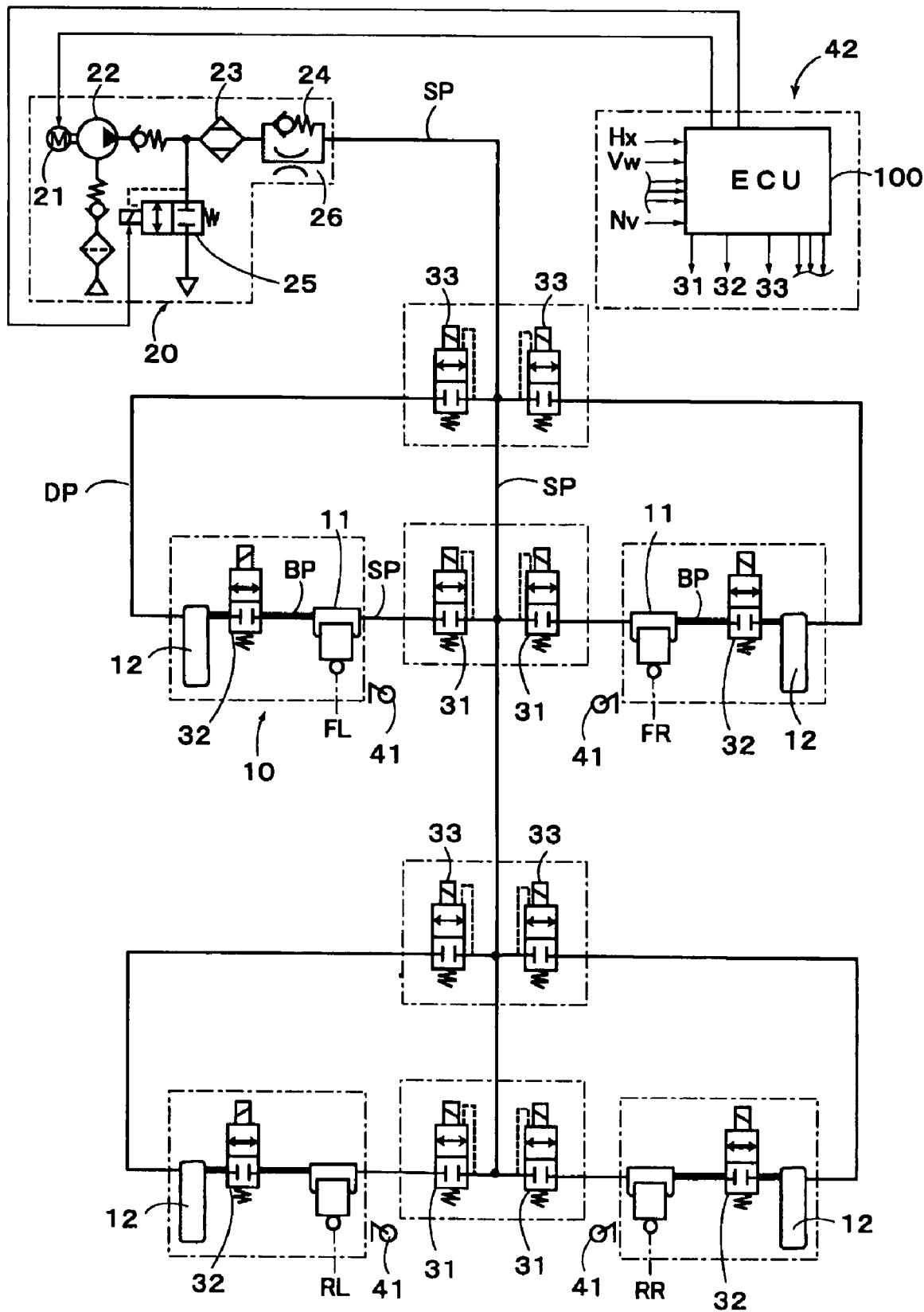
FIG. 1 is a structural view illustrating a vehicle height adjusting apparatus according to an embodiment of the present invention.

An embodiment of the present invention will be explained with reference to the attached drawings. FIG. 1 illustrates an overall structure of a vehicle height adjusting apparatus. An air spring portion 10 (air spring means), an adjusting valve 31, a switching valve 32, and an auxiliary valve 33 are provided at each of four wheels of a vehicle, i.e., a front-right wheel FR, a front-left wheel FL, a rear-right wheel RR, and a rear-left wheel RL. Each air spring portion 10 is connected to an air supply source 20 via a piping SP. In FIG. 1, components surrounded by a dashed-dotted line can be structurally united to thereby achieve a simplified installation in a vehicle. In this case, a different combination of components from that surrounded by a dashed-dotted line illustrated in FIG. 1 may be possible. In the following, the air spring portion 10 provided at one of four wheels will be explained. However, the other three wheels are each also equipped with the air spring portion 10.

The air spring portion 10 includes a main chamber 11 serving as a main air chamber and a sub chamber 12 serving as a sub air chamber. The adjusting valve 31 is arranged at the piping SP that is connected to the main chamber 11. The main chamber 11 and the sub chamber 12 are connected to each other by means of a piping BP having a large flow passage area and at which the switching valve 32 is arranged. Further, the sub chamber 12 is connected to the air supply source 20 by means of the piping SP, and a piping DP at which the auxiliary valve 33 is arranged. As illustrated in FIG. 1, according to the present embodiment, the adjusting valve 31 and the auxiliary valve 33 are each configured by a normally closed electromagnetic on-off valve. In addition, the switching valve 32 is configured by a normally closed electromagnetic on-off valve. A fluid passage area of the switching valve 32 is configured to be large when the valve 32 is in an open position. According to the present embodiment, the adjusting valve 31, the auxiliary valve 33, and the switching valve 32 are each explained as an electromagnetic on-off valve driven by an electromagnetic solenoid. Alternatively, an on-off valve driven by a signal pressure (pilot pressure) such as air pressure and hydraulic pressure can be used for constituting the vehicle height adjusting apparatus.

The air supply source 20 is constituted in such a way that, when a compressor 22 is driven by a motor 21, dry and pressurized (compressed) air is outputted and supplied from the air supply source 20 through a drier 23 and a check valve 24. In addition, in the cases where an exhaust valve 25 constituted by a normally-closed electromagnetic on-off valve is shifted to an open position while the compressor 22 is in a non-drive state, air is discharged from the air supply source 20 through an orifice 26 and the drier 23. That is, the drier 23 is configured to recover when air is discharged. The discharged air of the air spring portion 10 is discharged through the air supply source 20, accordingly.

As illustrated in FIG. 1, a height sensor 41 is provided in the vicinity of each of the wheels. A detection signal Hx of the height sensor 41 is input to an electronic control unit, i.e., ECU, 100. In addition, detecting means 42 for detecting a height lowering command and a height rising command by a passenger (including a driver), for example, is provided. A signal detected by the detecting means 42 (i.e., detection signal) is also input to the ECU 100. For example, the detecting means 42 is constituted by a switch (not shown) for making the height lowering command and the height rising command, or is configured in such a way that the detection signal can be outputted in the ECU 100 in response to an intention of a passenger (for example, a driver touches a vehicle door while the ignition key is kept inserted). Further, the detecting means 42 is achieved by reading a sensor signal and an internal calculation signal of the other electronic control unit (not shown) through a communication bus (not shown). In this case, for example, a wheel speed Vw, a vehicle speed (velocity) Vx, a steering angle St, a lateral acceleration Gy, a longitudinal acceleration Gx, a yaw rate Yr, and a shift position signal of a transmission (not shown) such as parking (P) and neutral (N) are used as the sensor signal. Furthermore, a vehicle according to the present embodiment is equipped with a navigation system (not shown) to thereby determine a transition state of the vehicle from a driving state to a stopped state (which will be hereinafter simply referred to as "transition state") on the basis of an output signal Nv of the navigation system.

Figure 2:
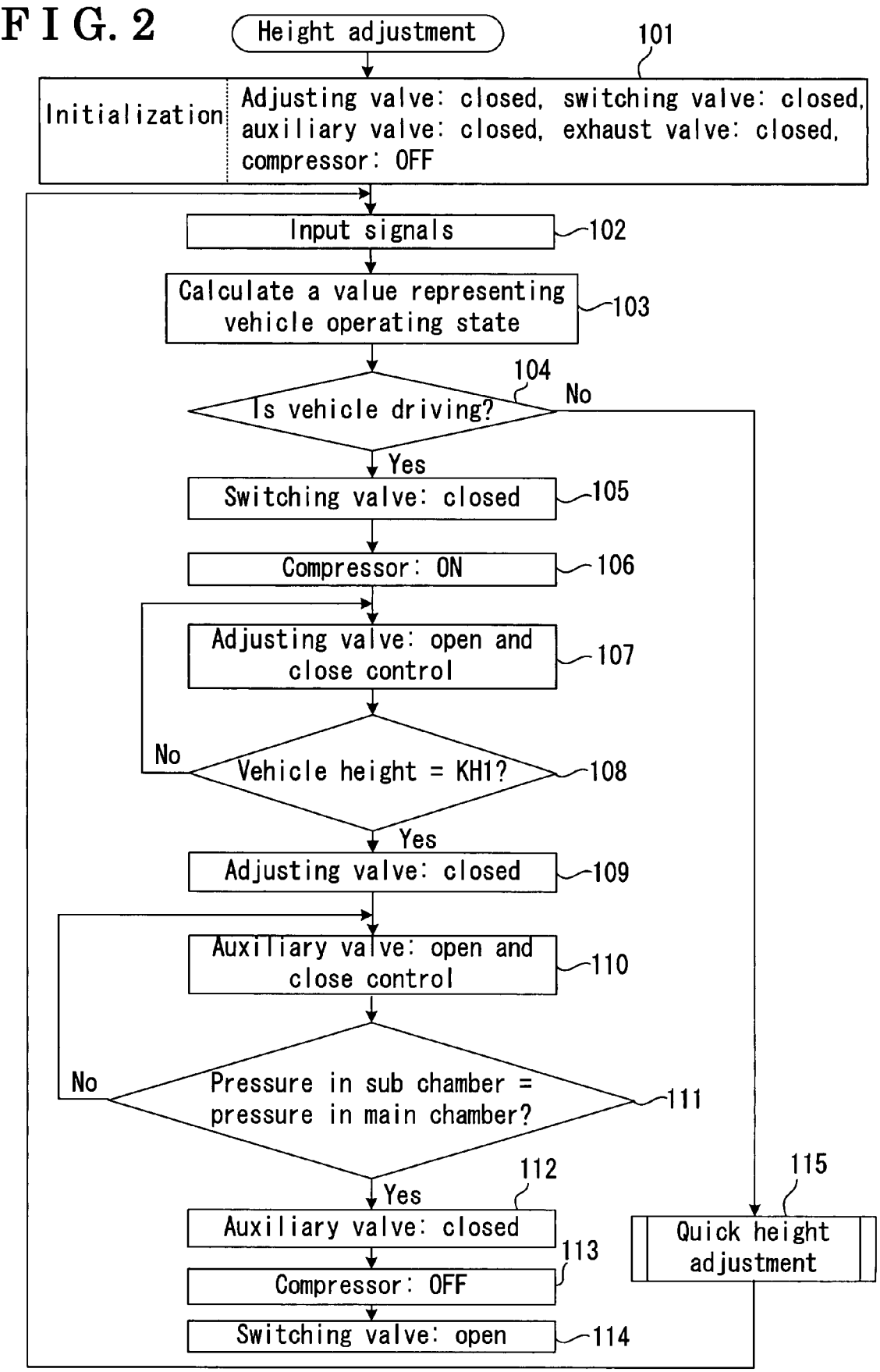
FIG. 2 is a flowchart illustrating a height adjustment process according to the embodiment of the present invention.
Figure 3:
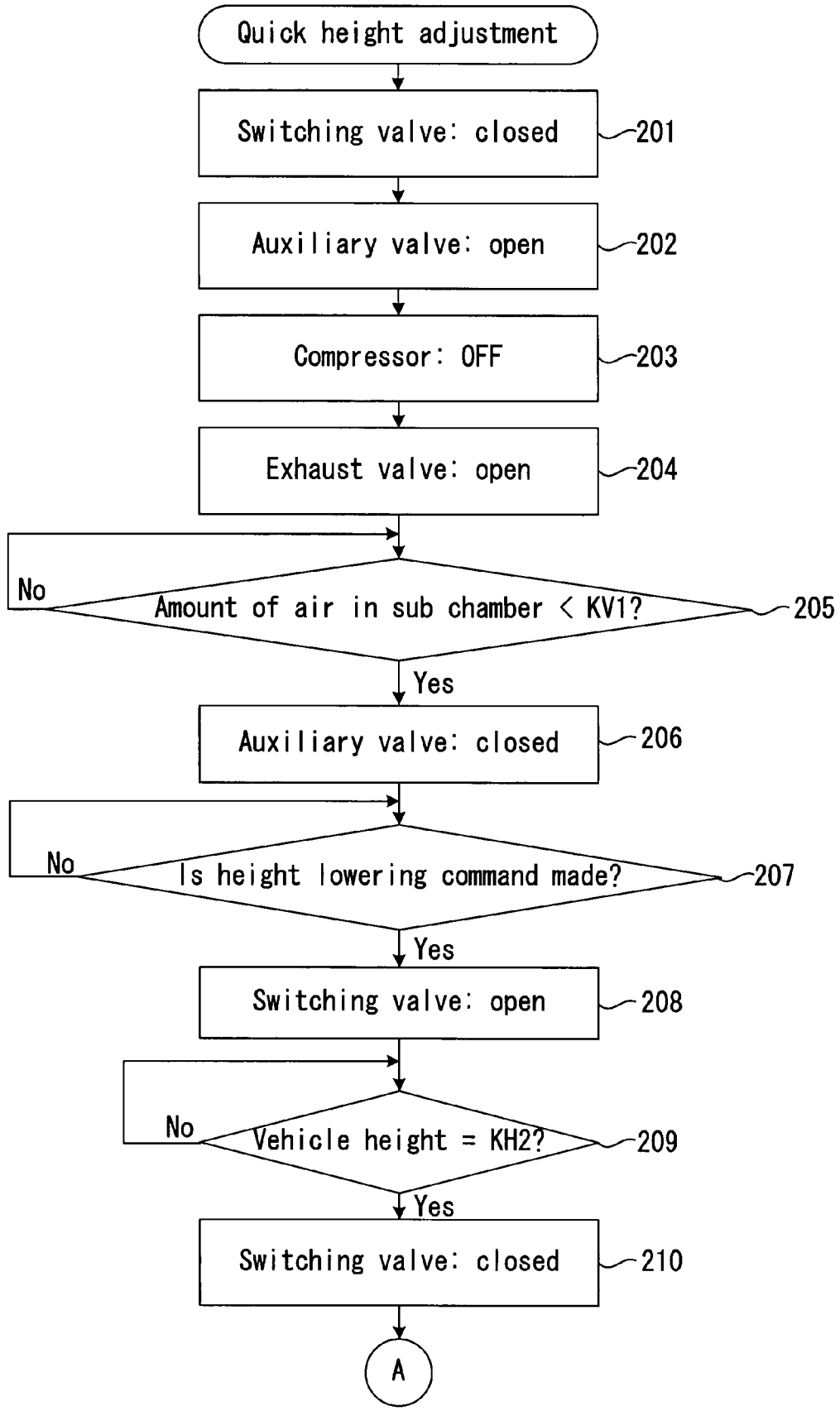
FIG. 3 is a flowchart illustrating a quick height adjustment process as a sub routine according to the embodiment of the present invention.
Figure 4:
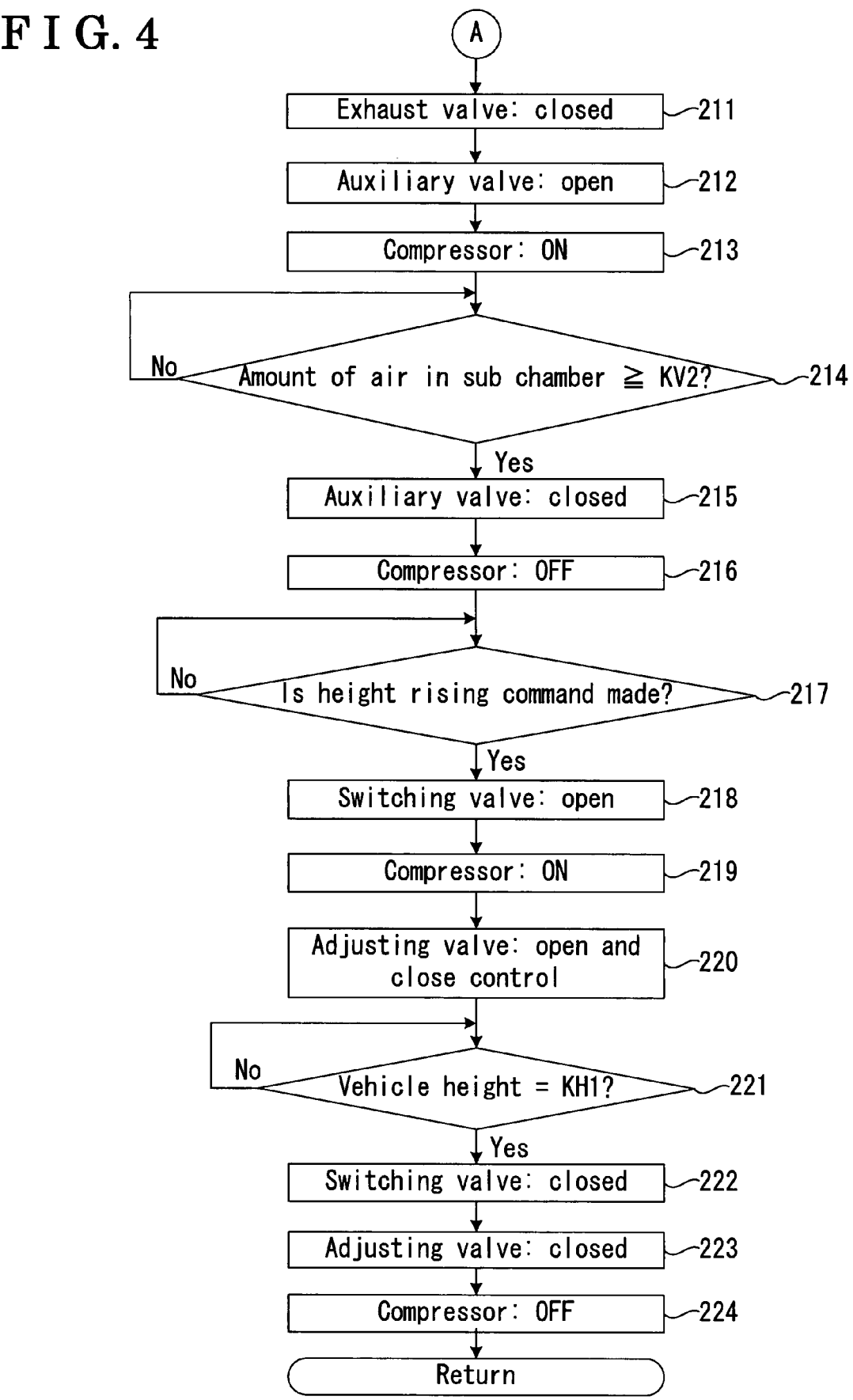
FIG. 4 is another flowchart illustrating the quick height adjustment process as the sub routine according to the embodiment of the present invention.

The ECU 100 is constituted by a microcomputer (not shown) in which a ROM (not shown) stores programs corresponding to various controls including flowcharts illustrated in FIGS. 2 to 4, a CPU (not shown) conducts the programs, and a RAM (not shown) temporarily stores variable data required for conducting the programs. That is, the ECU 100 includes operating state determining means and controlling means according to the present embodiment. The motor 21, the exhaust valve 25, the adjusting valve 31, the switching valve 32, and the auxiliary valve 33 are all driven and controlled according to a process explained below. In this case, the same process can be applied to all wheels. Alternatively, different processes may be applied to the respective wheels, or to the front wheels attached to respective front axles and the rear wheels attached to respective rear axles.

FIG. 2 illustrates a process for adjusting a vehicle height according to the present embodiment. First, in step 101, an initialization is performed so that the motor 21 is turned off (therefore, the compressor 22 is turned off), and the exhaust valve 25, the adjusting valve 31, the auxiliary valve 33, and the switching valve 32 are each shifted to a closed position as illustrated in FIG. 1. In step 102, detection signals of various sensors including the detection signal Hx of the height sensor 41 are input into the ECU 100 in addition to necessary signals sent through the communication bus. Next, a value representing the operating state of a vehicle (i.e., aforementioned transition state, and the like) is calculated on the basis of the aforementioned input signals in step 103 to determine whether or not the vehicle is moving and driving in step 104. For example, in the cases where the wheel speed Vw is equal to zero and the shift position signal indicates parking (P) or neutral (N), it is determined that the vehicle is in the stopped state. In addition, it is determined that the vehicle is in the transition state (from the driving state to the stopped state) according to the output signal Nv of the navigation system. Further, it is determined that the vehicle is moving and driving in a case other than the stopped state and the transition state.

In the cases where it is determined that the vehicle is driving in step 104, the process proceeds to step 105 in which the switching valve 32 is specified to be in the closed position, to step 106 in which the compressor 22 is turned on, and to step 107 in which the adjusting valve 31 is controlled to be opened and closed (i.e., open and close control). The open and close control of the adjusting valve 31 is continued until the vehicle height reaches a predetermined value KH1 (i.e., standard height) in step 108. In the cases where the vehicle height reaches the predetermined value KH1 in step 108, the adjusting valve 31 is shifted to the closed position in step 109.

While the vehicle height is maintained at the predetermined value KH1, the auxiliary valve 33 is controlled to be opened and closed (i.e., open and close control) in step 110 so that (compressed) air is supplied from the air supply source 20 to the sub chamber 12. The open and close control of the auxiliary valve 33 is continued until it is determined that air pressure in the sub chamber 12 becomes substantially equal to that in the main chamber 11 in step 111. When it is determined that the air pressure in the sub chamber 12 is substantially equal to that in the main chamber 11 in step 111, the auxiliary valve 33 is shifted to the closed position in step 112, and the compressor 22 is turned off in step 113. That is, the air spring portion 10 is constituted only by air in the main chamber 11.

On the other hand, in the cases where the switching valve 32 is shifted to the open position in the following step 114, the air spring portion 10 is changed to be constituted by a sum of air in the main chamber 11 and the sub chamber 12. That is, as compared to a case where the air spring portion 10 is constituted only by the main chamber 11, an entire volume of air of the air spring portion 10 increases. As a result, a constant of spring as the air spring portion 10 decreases to thereby achieve a switching from hard spring characteristics to soft spring characteristics. In the cases where an operation in step 114 is omitted or skipped, the process may return from step 113 to step 102. Alternatively, immediately after an operation in step 113, a step may be added for selecting the hard spring characteristics or the soft spring characteristics in response to a command from a passenger. On the other hand, in the cases where it is determined that a vehicle is in the stopped state or in the transition state in step 104, a quick height adjustment process is performed as explained below.

FIGS. 3 and 4 each illustrate a subroutine of the aforementioned step 115. In the cases where it is determined that the vehicle is in the stopped state or in the transition state in step 104, the process proceeds to step 201 in which the switching valve 32 is shifted to the closed position, to step 202 in which the auxiliary valve 33 is shifted to the open position, to step 203 in which the compressor 22 is turned off, and to step 204 in which the exhaust valve 25 is shifted to the open position. Accordingly, air in the sub chamber 12 is discharged through the auxiliary valve 33, the orifice 26, the drier 23, and the exhaust valve 25. In the cases where a long time period is required for discharging air from all the sub chambers 12 provided at respective wheels, the auxiliary valves 33 for the front and rear wheels may be controlled in such a way that air may be preferentially discharged from the sub chambers 12 at the rear wheels, and then air may be discharged from the sub chambers 12 at the front wheels. Alternatively, air may be discharged from the four sub chambers 12 one by one in order per predetermined time period so that the air pressure and an amount of remaining air in four sub chambers 12 can be identical during the discharge process.

In the cases where an amount of air in the sub chamber 12 is less than a predetermined value KV1 in step 205, as a result of the aforementioned discharge process, the auxiliary valve 33 is shifted to the closed position in step 206. Accordingly, the amount of air in the sub chamber 12 is kept to be less than the predetermined value KV1. Then, when the vehicle height lowering command by a passenger is detected in step 207, for example, the process proceeds to step 208 in which the switching valve 32 is shifted to the open position. The air in the main chamber 11 is discharged to the sub chamber 12 at once through the piping BP having a large flow passage area and the switching valve 32 to thereby lower the vehicle height. That is, a value of the vehicle height becomes smaller (i.e., KH2) than the predetermined value KH1 (standard height), which leads to an easy ingress and egress of a passenger and easy loading and unloading of luggage. When it is determined that the vehicle height is equal to the predetermined value KH2 (<KH1) in step 209, the process proceeds to step 210 in which the switching valve 32 is shifted to the closed position.

The process then proceeds to step 211 in which the exhaust valve 25 is shifted to the closed position, to step 212 in which the auxiliary valve 33 is shifted to the open position, to step 213 in which the compressor 22 is turned on. Accordingly, air is supplied through the auxiliary valve 33 to the sub chamber 12 until an amount of air in the sub chamber 12 becomes equal to or greater than the predetermined value KV2. In order to horizontally maintain a vehicle when the vehicle height rising command is made, compressed air may be supplied to all the sub chambers 12 provided at respective wheels one by one in order by means of the respective auxiliary valves 33 so that the air pressure and the amount of air in four sub chambers 12 may be identical during the supply of compressed air. When it is determined that the amount of air in the sub chambers 12 is equal to or greater than the predetermined value KV2, the auxiliary valve 33 is shifted to the closed position in step 215 and the compressor 22 is turned off in step 216. Accordingly, the amount of air in the sub chamber 12 is kept equal to or greater than the predetermined value KV2. Then, when the height rising command by a passenger is detected in step 217 or it is detected that the vehicle height is below the predetermined value KH2, the process proceeds to step 218 in which the switching valve 32 is shifted to the open position, to step 219 in which the compressor 22 is turned on, and to step 220 in which the adjusting valve 31 is controlled to be opened and closed (i.e., open and close operation). The open and close operation of the adjusting valve 31 continues until it is determined that the vehicle height reaches the predetermined value KH1 in step 221. When it is determined that the vehicle height is equal to the predetermined value KH1 in step 221, the switching valve 32 is shifted to the closed position in step 222. Then, the adjusting valve 31 is shifted to the closed position in step 223 followed by the turning off of the compressor 22 in step 224. The process returns to the main routine illustrated in FIG. 2 to repeat operations from step 102.

Figure 5:
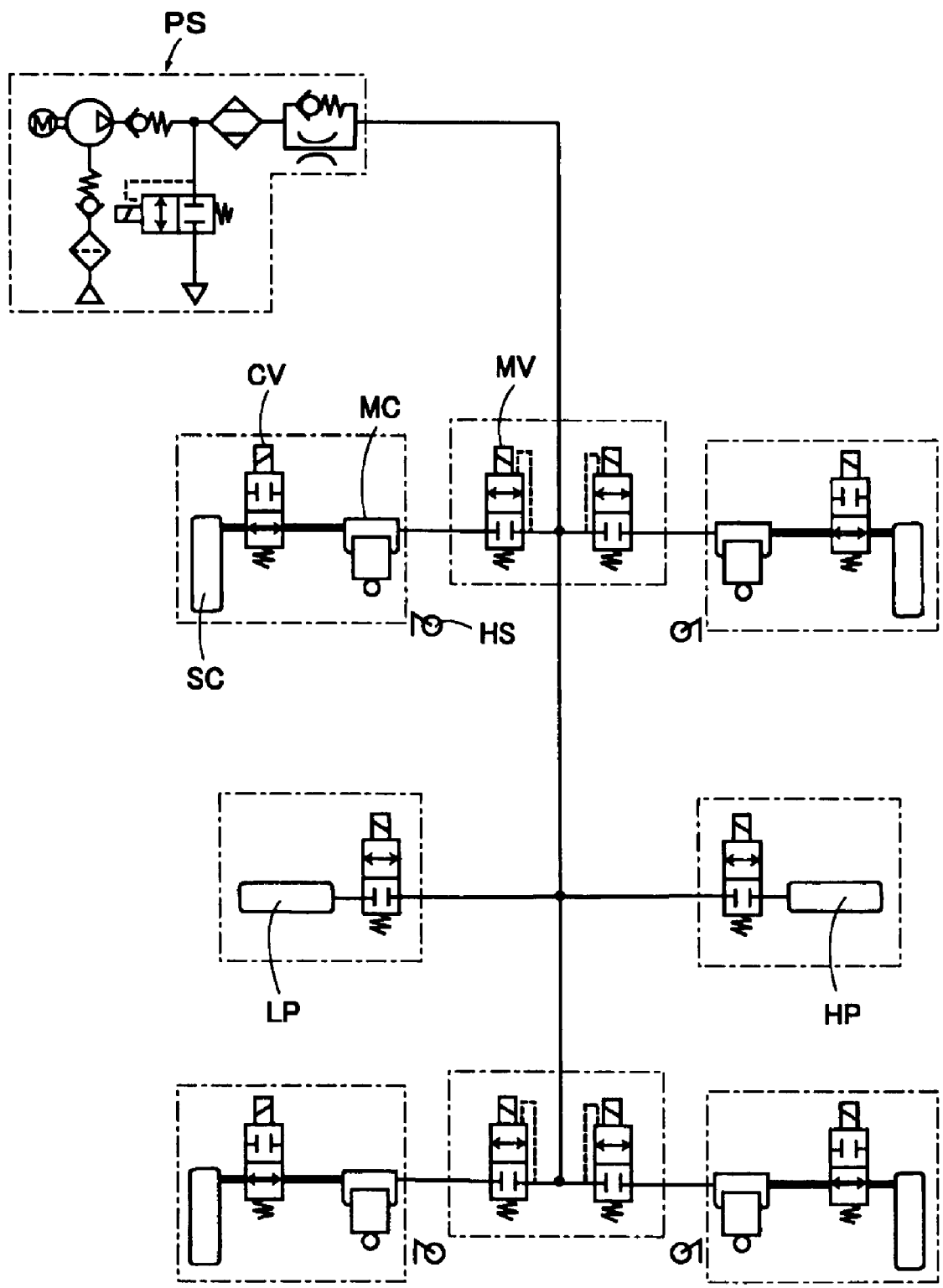
FIG. 5 is a structural view illustrating a conventional vehicle height adjusting apparatus.

As mentioned above, in the cases where the vehicle is moving and driving, the sub chamber 12 is used for changing the spring characteristics. In the cases where it is determined that the vehicle is in the stopped state or transition state and at that time the vehicle is at the standard vehicle height (KH1), air in the sub chamber 12 is discharged beforehand while the communication between the main chamber 11 and the sub chamber 12 is interrupted. Then, when the height lowering command is made by a passenger, for example, through a height lowering switch, for the purpose of getting in and out of a vehicle, the vehicle height can be rapidly lowered by communicating the main chamber 11 and the sub chamber 12 with each other. In addition, in the cases where it is determined that the vehicle is in the stopped state or transition state and at that time the vehicle is at the lower height than the standard height, compressed air is supplied to the sub chamber 12 beforehand while the communication between the main chamber 11 and the sub chamber 12 is interrupted. Then, when the vehicle height rising command is made by a passenger after the passenger's getting in and out of a vehicle, the vehicle height can be rapidly raised by communicating the main chamber 11 and the sub chamber 12 with each other. As compared to a structure illustrated in FIG. 5, time for adjusting the vehicle height can be significantly reduced by one twelfth.

In consideration of durability of the compressor 22, accuracy for distinguishing the vehicle driving state and the stopped state (or transition state, i.e., for which the quick height adjustment is required) is necessary in the case of performing the quick height adjustment by using the sub chambers 12. In light of the forgoing, a place for conducting the quick height adjustment (for example, a parking space at home) can be registered by a passenger beforehand in the case that the vehicle is equipped with the navigation system. Accordingly, the air pressure in each of the sub chambers 12 can be adjusted at a place desired by a passenger to thereby prevent not only useless on/off control of the compressor 22 but also useless control of the entire apparatus.

According to the aforementioned embodiment, in the cases where it is determined that the vehicle is in the transition state from the running state to the stopped state or in the stopped state, the adjusting valve 31 and the switching valve 32 are each shifted to the closed position so as to prohibit the communication of air. Then, the auxiliary valve 33 is shifted to the open position so that air in the sub chamber 12 can be discharged by the predetermined amount through the air supply source 20 prior to the shifting of the auxiliary valve 33 to the closed position. Thus, the vehicle height adjustment time can be significantly reduced with a simple structure of the apparatus.

In addition, according to the aforementioned embodiment, the ECU 100 controls the switching valve 32 to be shifted to the open position in response to the height lowering command so as to discharge air in the main chamber 11 to the sub chamber 12 after the ECU 100 determines that the vehicle is in one of the transition state and the stopped state and air in the sub chamber 12 is discharged by the predetermined amount through the air supply source 20.

Further, according to the aforementioned embodiment, when a height of the vehicle falls below the predetermined value KH2, the ECU controls the auxiliary valve 33 to be shifted to the open position after controlling the switching valve 32 to be shifted to the closed position so as to supply air from the air supply source 20 to the sub chamber 12 by a predetermined amount, and then controls the auxiliary valve 33 to be shifted to the closed position.

Furthermore, according to the aforementioned embodiment, the ECU 100 controls the switching valve 32 to be shifted to the open position in response to the height rising command after air is supplied from the air supply source 20 to the sub chamber 12 by the predetermined amount by means of the auxiliary valve 33.

Furthermore, according to the aforementioned embodiment, when the ECU 100 determines that the vehicle is in the driving state, the ECU performs an open and close control on the adjusting valve 31 with the switching valve 32 in the closed position to supply air from the air supply source 20 to the main chamber 11 so that a height of the vehicle is adjusted to be the predetermined value KH1, and then performs an open and close control on the auxiliary valve 33 to supply air from the air supply source 20 to the sub chamber 12 so that the air pressure in the sub chamber 12 and the air pressure in the main chamber 11 are controlled to be equal to each other.

Furthermore, according to the aforementioned embodiment, the ECU 100 determines that the vehicle is in the stopped state in a case where a wheel speed of the vehicle is equal to zero and a shift position of the vehicle is in one of parking and neutral positions.

As a result, the stopped state of the vehicle can be easily and securely determined. For example, the air supply source 20 can be configured to be driven only as needed, and then the durability of the air supply source 20 can be improved.

Furthermore, according to the aforementioned embodiment, the vehicle is equipped with the navigation system, and the ECU 100 determines the transition state of the vehicle from the driving state to the stopped state based on an output signal of the navigation system.

As a result, the transition of the vehicle from the driving state to the stopped state can be predicted beforehand to thereby discharge air in the sub chamber 12 sufficiently in advance.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicle height adjusting apparatus for adjusting a height of a vehicle, comprising:
    air spring means provided at each of wheels of a vehicle and including a main air chamber and a sub air chamber;
    an air supply source including a compressor, the air supply source pressurizing and outputting air at a time the compressor is driven and discharging air at a time the compressor is non-driven;
    an adjusting valve selectively opening and closing a first passage connecting between the air supply source and the main air chamber;
    a switching valve selectively opening and closing a second passage connecting between the main air chamber and the sub air chamber, the switching valve causing a total air volume of the air spring means to be constituted either by only the main air chamber or by a sum of the main air chamber and the sub air chamber; the switching valve and the adjusting valve being controlled in response to a height lowering command and a height rising command;
    an auxiliary valve selectively opening and closing a third passage connecting between the sub air chamber and the air supply source;
    operating state determining means for determining an operating state of the vehicle including a driving state, a stopped state and a transition state from the driving state to the stopped state; and
    controlling means for controlling the adjusting valve and the switching valve to shift to closed positions so as to close the first and second passages, respectively, and controlling the auxiliary valve to shift to an open position so as to open the third passage and to discharge air in the sub air chamber by a predetermined amount through the air supply source and then controlling the auxiliary valve to shift to a closed position so as to close the third passage in a case that the operating state determining means determines that the vehicle is in one of the transition state and the stopped state.

2. A vehicle height adjusting apparatus according to claim 1, wherein the controlling means controls the switching valve to shift to an open position in response to the height lowering command so as to discharge air in the main air chamber to the sub air chamber after the operating state determining means determines that the vehicle is in one of the transition state and the stopped state and air in the sub air chamber is discharged by a predetermined amount through the air supply source.

3. A vehicle height adjusting apparatus according to claim 1, wherein when a height of the vehicle falls below a predetermined value, the controlling means controls the auxiliary valve to shift to the open position after controlling the switching valve to shift to the closed position so as to supply air from the air supply source to the sub air chamber by a predetermined amount, and then controls the auxiliary valve to shift to the closed position.

4. A vehicle height adjusting apparatus according to claim 3, wherein the controlling means controls the switching valve to be shied to the open position in response to the height rising command after air is supplied from the air supply source to the sub air chamber by a predetermined amount by means of the auxiliary valve.

5. A vehicle height adjusting apparatus according to claim 1, wherein when the operating state determining means determines that the vehicle is in the driving state, the controlling means performs an open and close control on the adjusting valve with the switching valve in the closed position to supply air from the air supply source to the main air chamber so that a height of the vehicle is adjusted to be a predetermined value, and then performs an open and close control on the auxiliary valve to supply air from the air supply source to the sub air chamber so that an air pressure in the sub air chamber and an air pressure in the main air chamber are controlled to be equal to each other.

6. A vehicle height adjusting apparatus according to claim 1, wherein the operating state determining means determines that the vehicle is in the stopped state in a case where a wheel speed of the vehicle is equal to zero and a shift position of the vehicle is in one of parking and neutral positions.

7. A vehicle height adjusting apparatus according to claim 1, wherein the vehicle is equipped with a navigation system, and the operating state determining means determines the transition state of the vehicle from the driving state to the stopped state based on an output signal of the navigation system.

* * * * *